(12) United States Patent
Sun et al.

(10) Patent No.: US 12,726,995 B2
(45) Date of Patent: Sep. 1, 2026

(54) SCHEDULING RESTRICTION ENHANCEMENTS FOR LTE AND 5G NR DYNAMIC SPECTRUM SHARING

(71) Applicant: Apple Inc., Cupertino, CA (US)

(72) Inventors: Haitong Sun, Irvine, CA (US); Chunhai Yao, Beijing (CN); Chunxuan Ye, San Diego, CA (US); Dawei Zhang, San Diego, CA (US); Hong He, Cupertino, CA (US); Huaning Niu, San Jose, CA (US); Oghenekome Oteri, San Diego, CA (US); Sigen Ye, Whitehouse Station, NJ (US); Wei Zeng, San Diego, CA (US); Wei Zhang, Santa Clara, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 18/492,158

(22) Filed: Oct. 23, 2023

(65) Prior Publication Data

US 2024/0049225 A1 Feb. 8, 2024

Related U.S. Application Data

(63) Continuation of application No. 17/438,005, filed as application No. PCT/CN2020/120589 on Oct. 13, 2020, now Pat. No. 12,063,645.

(51) Int. Cl.
*H04W 72/23* (2023.01)
*H04L 5/00* (2006.01)
(Continued)

(52) U.S. Cl.
CPC ............ *H04W 72/23* (2023.01); *H04L 5/001* (2013.01); *H04L 5/0053* (2013.01);
(Continued)

(58) Field of Classification Search
CPC .. H04W 72/23; H04W 72/1268; H04L 5/001; H04L 5/0053; H04L 5/0094
See application file for complete search history.

(56) References Cited

U.S. PATENT DOCUMENTS 12,127,200 B2 * 10/2024 Babaei .................. H04W 72/23
12,439,416 B2 * 10/2025 Yoshioka ................ H04L 5/001
(Continued)

FOREIGN PATENT DOCUMENTS

| | | |
|---|---|---|
| CN | 108521321 | 9/2018 |
| CN | 111132359 | 5/2020 |
| WO | 2020204481 | 3/2020 |

OTHER PUBLICATIONS

Office Action for CN 202080106176.9; Jan. 23, 2025.
(Continued)

*Primary Examiner* — Chandrahas B Patel
(74) *Attorney, Agent, or Firm* — Kowert, Hood, Munyon, Rankin & Goetzel, P.C.

(57) ABSTRACT

Methods and devices for a base station acting as a primary cell to perform dual spectrum sharing (DSS) with a first user equipment device (UE) over a 5G NR connection and a second UE over an LTE connection. The first UE establishes the 5G NR connection with the primary cell and one or more secondary cells. One of the secondary cells is configured in the 5G NR connection to provide downlink control information to the UE for the primary cell, to avoid collisions by the primary cell with LTE control transmissions.

20 Claims, 8 Drawing Sheets

(51) Int. Cl.
*H04W 72/1268* (2023.01)
*H04W 16/14* (2009.01)

(52) U.S. Cl.
CPC ....... *H04L 5/0094* (2013.01); *H04W 72/1268* (2013.01); *H04W 16/14* (2013.01)

(56) References Cited

U.S. PATENT DOCUMENTS

2014/0198748 A1 7/2014 Lee
2022/0312451 A1 * 9/2022 Aiba ..................... H04L 5/0053

OTHER PUBLICATIONS

Extended European Search Report for EP Patent Application No. 23194305.1; Nov. 29, 2023.
ZTE “Discussion on Cross-Carrier Scheduling from SCell to PCell”; 3GPP TSG RAN WG1 Meeting #102-e R1-2005440; Aug. 17, 2020.
Office Action for EP 20956991.2; Mar. 27, 2025.
Nokia Cross-carrier scheduling from SCell to PCell 3GPP TSG RAN WG1 #102 R1-2006469; Aug. 17, 2020.
International Search Report for PCT Patent Application No. PCT/CN2020/120589; Jul. 2, 2021.
VIVO “Discussion on Scell scheduling P(S)cell”; 3GPP TSG RAN WG1 #102-e R1-2005409; Aug. 8, 2020.
OPPO “Cross-carrier scheduling”; 3GPP TSG RAN WG1 #102-e R1-2006063; Aug. 7, 2020.
Etri “Discussion on cross-carrier scheduling for NR DSS”; 3GPP TSG RAN WG1 #102-e R1-2006362; Aug. 7, 2020.

* cited by examiner

SCHEDULING RESTRICTION ENHANCEMENTS FOR LTE AND 5G NR DYNAMIC SPECTRUM SHARING

PRIORITY CLAIM

This application is a continuation of U.S. patent application Ser. No. 17/438,005, filed on Sep. 10, 2021, titled "Scheduling Restriction Enhancements for LTE and 5G NR Dynamic Spectrum Sharing", which is a national stage application of International Application No. PCT/CN2020/120589, filed on Oct. 13, 2020, titled "Scheduling Restriction Enhancements for LTE and 5G NR Dynamic Spectrum Sharing", which are both hereby incorporated by reference in their entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including methods, systems, and apparatuses to improve performance in dynamic spectrum sharing (DSS) deployments.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G NR to take advantage of higher throughputs possible at higher frequencies.

In a dual deployment scenario of LTE and 5G NR, dynamic spectrum sharing (DSS) may be implemented, whereby a portion of the spectrum is shared between LTE and 5G NR. However, sharing a portion of spectrum between multiple RATs may introduce complications to effectively utilize the available radio resources. Therefore, improvements in the field are desired.

SUMMARY

Embodiments are presented herein of, inter alia, systems, apparatuses, and methods for scheduling enhancements in a dynamic spectrum sharing (DSS) scenario.

In some embodiments, a user equipment device (UE) establishes a 5G NR connection with a primary cell and one or more secondary cells. The primary cell may additionally establish an LTE connection with the same or a different UE. One of the secondary cells may be configured in the 5G NR connection to provide downlink control information to the UE for the primary cell, to avoid collisions by the primary cell with LTE control transmissions.

In some embodiments, a base station to performs dual spectrum sharing (DSS) with a first user equipment device (UE) over a 5G NR connection and a second UE over an LTE connection. The base station acts as a primary cell for the first UE, and one or more secondary cells also establish a 5G NR connection with the first UE. One of the secondary cells is configured in the 5G NR connection to provide downlink control information (DCI) to the UE for the primary cell. The DCI provided by the secondary cell may schedule transmissions between the first UE and the primary cell and/or may perform other control functions for the first UE.

The base station may provide LTE control transmissions to the second UE, and offloading transmission of the 5G NR DCI to the secondary cell may prevent collisions between LTE and 5G NR control information.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
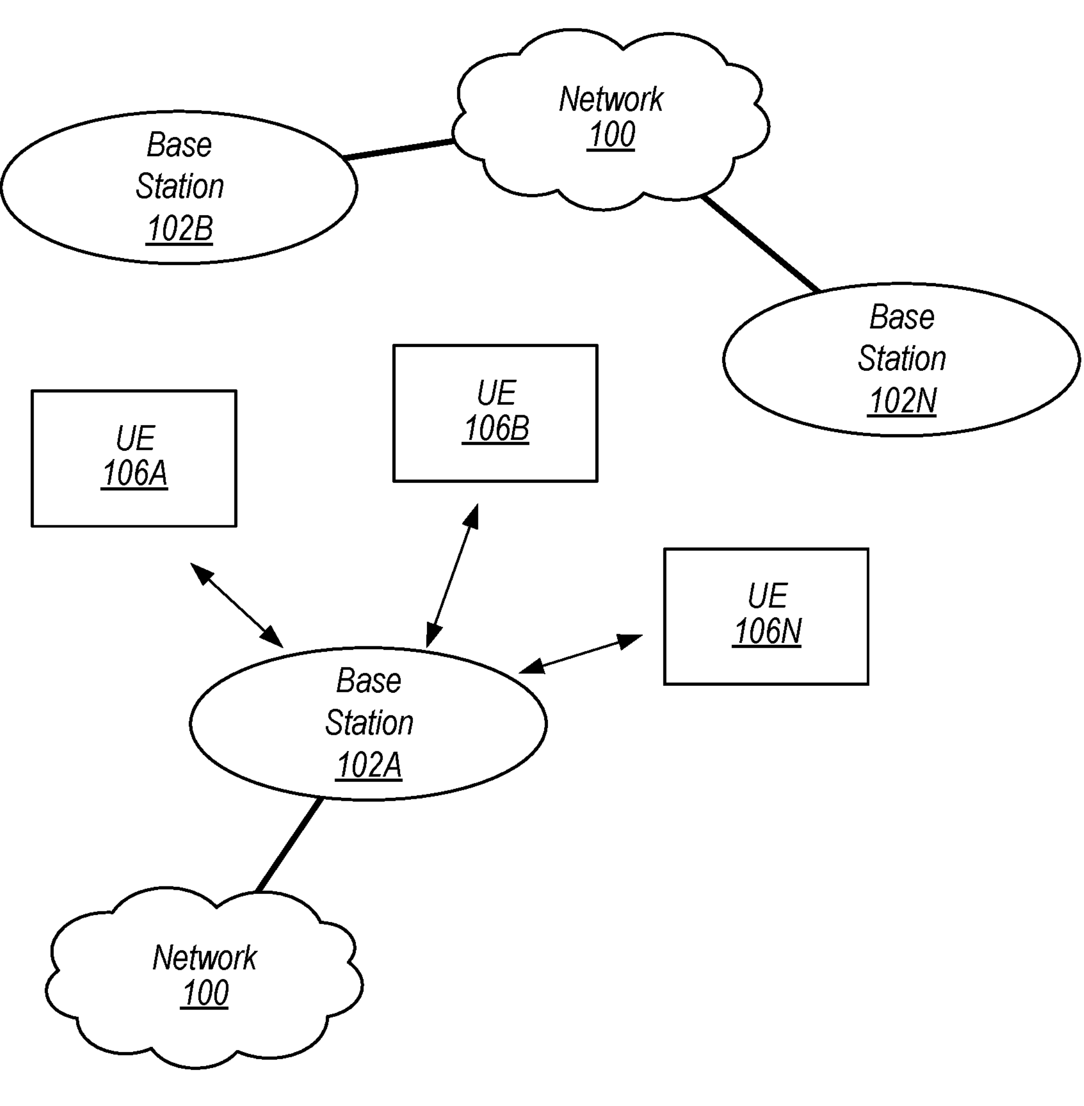
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity
AMF: Access Management Function
AS: access stratum
NAS: non-access stratum
RAT: radio access technology
PLMN: public land mobile network
LAA: licensed assisted access
CA: carrier aggregation
Rx: receiver
PDCCH: physical downlink control channel
PDSCH: physical downlink shared channel
PRB: physical resource block
DCI: downlink control information
SNR: signal-noise ratio
RSRP: reference signal received power
SF: subframe

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™_based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while BLUETOOTH™ channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
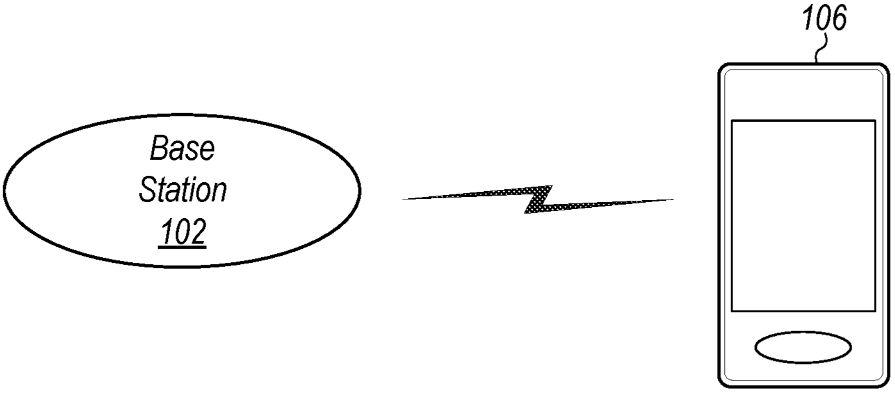
FIG. 2 illustrates a base station (BS) in communication with a user equipment device (UE), according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for performing signal detection as described herein, e.g., according to one or more of the methods described herein. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible. Additionally or alternatively, a UE may simultaneously establish a connection with a "primary cell" and one or more "secondary cells", to increase throughput. The primary cell may be instantiated within a first base station, and the one or more secondary cells may be instantiated in the same base station or one or more other base stations, which may be collocated or remote from the first base station.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple input multiple output (MIMO) communications) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and BLUETOOTH™. Other configurations are also possible.

The UE 106 and/or BS 102 may be configured to perform carrier aggregation (CA). For example, the BS 102 may use carriers using any combination of RATs to communicate with UE 106. As one possibility, the UE 106 and BS 102 may employ licensed assisted access (LAA) techniques, and may thus aggregate licensed and unlicensed spectrum for communication. Carrier aggregation may employ a primary cell (PCell) and one or more secondary cells (SCells), which may be collocated within a single base station tower, or may be distributed over a first BS and one or more neighboring BSs, according to various embodiments.

Figure 3:
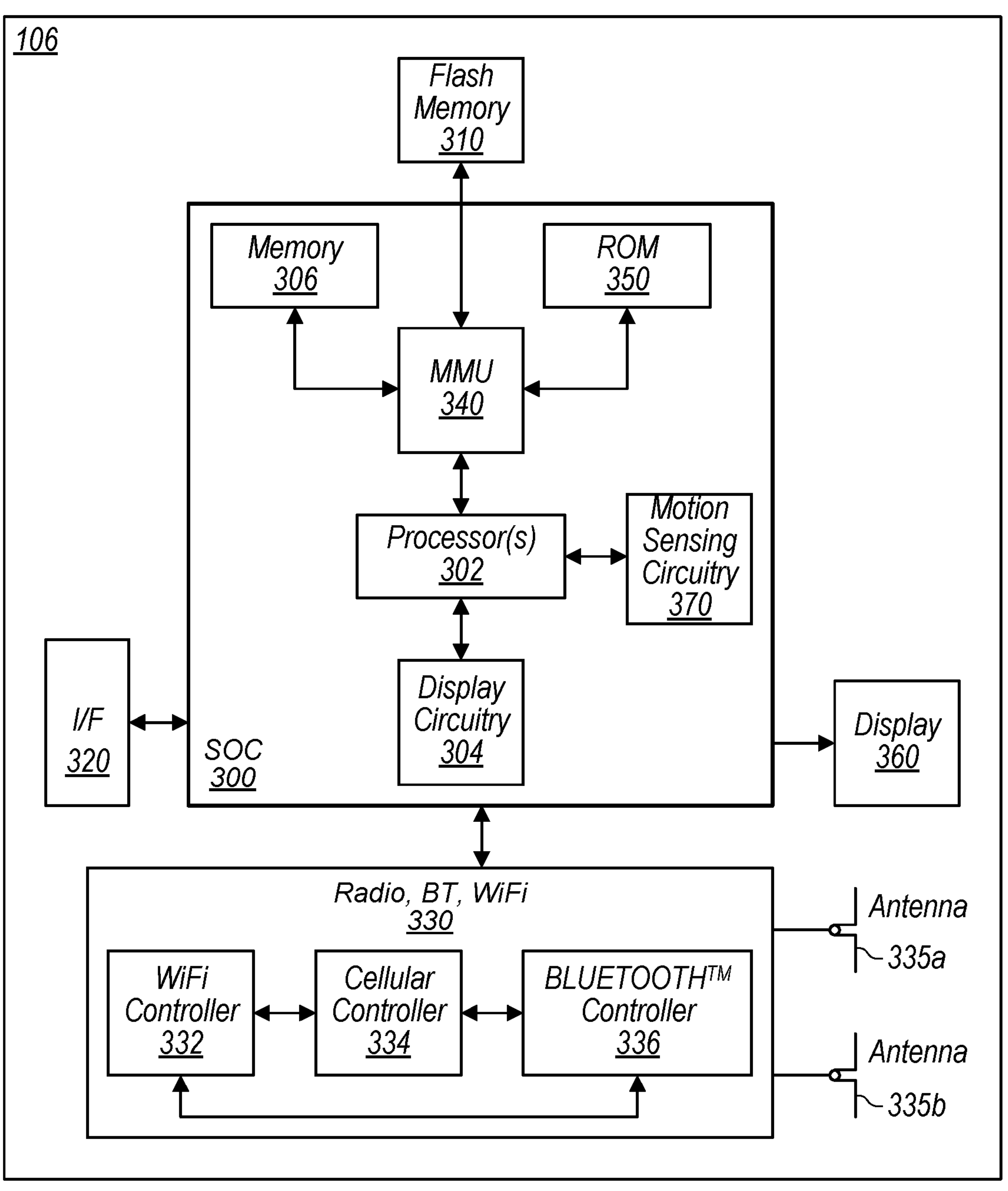
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including flash memory 310 or NAND memory), a connector interface I/F 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, NFC, GPS, etc.).

The UE device 106 may include at least one antenna, and in some embodiments multiple antennas 335*a* and 335*b* (and/or further additional antennas), for performing wireless communication with base stations and/or other devices. For example, the UE device 106 may use antennas 335*a* and 335*b* to perform the wireless communication. As noted above, the UE device 106 may in some embodiments be configured to communicate wirelessly using a plurality of wireless communication standards or radio access technologies (RATs).

The wireless communication circuitry may include Wi-Fi Logic (e.g., WiFi Controller 332), a Cellular Modem (e.g., cellular controller 334), and BLUETOOTH™ (BT) Logic (e.g., BLUETOOTH™ controller 336). The Wi-Fi controller 332 is for enabling the UE device 106 to perform Wi-Fi communications on an 802.11 network. The BLUETOOTH™ controller 336 is for enabling the UE device 106 to perform BLUETOOTH™ communications. The cellular controller 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
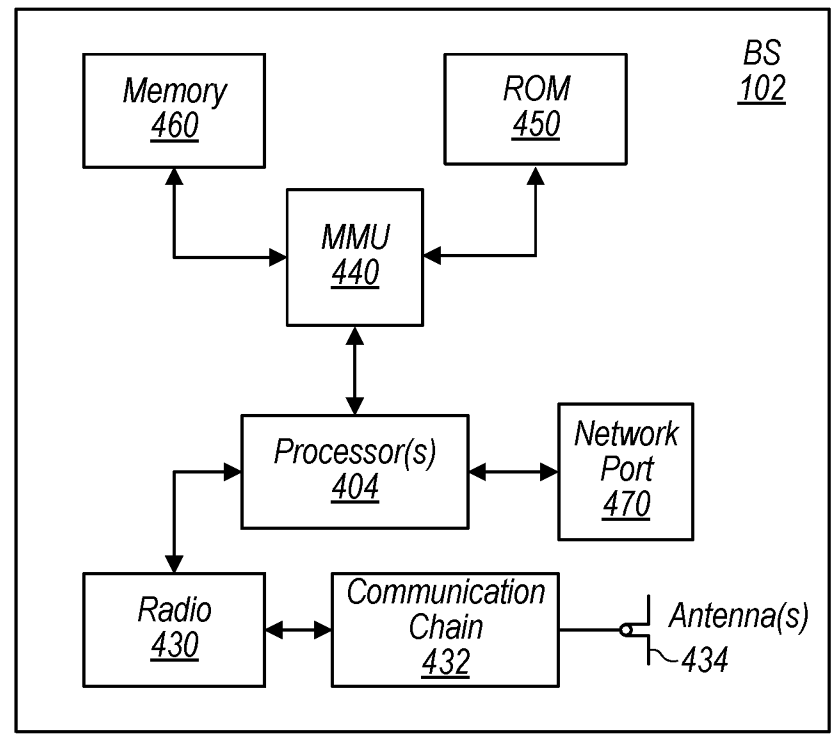
FIG. 4 illustrates an exemplary block diagram of a BS, according to some embodiments.

FIG. 4—Block Diagram of a Base Station (BS)

FIG. 4 illustrates an example block diagram of abase station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various and potentially multiple wireless communication standards, including, but not limited to, LTE, LTE-A, 5G NR, GSM, UMTS, CDMA2000, and/or Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communications according to LTE, a Wi-Fi radio for performing communications according to Wi-Fi, and/or a 5G NR radio for performing communications according to 5G NR. In such a case, the base station 102 may be capable of operating as both an LTE base station (eNB) and a 5G NR base station (gNB). As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein. The BS 102 may be configured to perform carrier aggregation (CA).

The BS 102 may be an eNodeB (eNB) or gNodeB (gNB), according to various embodiments.

Primary and Secondary Cells

5G New Radio (NR) and LTE, as well as other wireless networks, may include carrier aggregation (CA), enabling a user equipment device (UE) such as the UE 106 to communicate with multiple cells on separate bandwidths to increase overall throughput. CA techniques may allow for increased throughput or performance by efficiently using the spectrum/frequency resources available to a network. CA techniques may be used entirely in licensed spectrum, entirely in unlicensed spectrum, or in a mixture of licensed and unlicensed spectrum. For example, licensed assisted access (LAA) cells may be increasingly common. Note that an LAA cell may aggregate licensed and unlicensed spectrum of a radio access network, e.g., at a media access control level, among various possibilities. For example, an LAA cell (e.g., a special type of secondary cell or SCell) may operate in an unlicensed band and may be assisted by an LTE and/or NR cell (e.g., a primary cell or PCell) that may operate in a licensed band.

In general, a UE may establish a connection with the network through the PCell, and may subsequently establish a secondary connection with one or more SCells to increase throughput. The PCell and the one or more SCells may be collocated, or they may be instantiated as separate base stations, according to various embodiments. The PCell and the one or more SCells may operate according to the same RAT (e.g., 5G NR) or different RATs, according to various embodiments.

Additionally or alternatively, a single base station may operate as both a primary cell on a first RAT (e.g., 5G NR) for a first UE, and a primary cell on a second RAT (e.g., LTE) for a second UE.

Control Resource Set (CORESET) and Search Space

In 5G NR, a Control Resource Set (CORESET) may be defined as a set of resource element groups (REGs) with one or more symbol durations under a given numerology within which a UE may attempt to blindly decode downlink control information. In the time domain, a CORESET may have 1, 2, or 3 contiguous OFDM symbols, and a CORESET may be contiguous or non-contiguous in the frequency domain.

It is anticipated that up to three CORESETs may be configured for a BWP in a cell for a UE under 5G NR. Multiple CORESETs may be overlapped in frequency and time for a UE, and multiple search spaces may be associated with a CORESET. In a CORESET, different search spaces (e.g., a common search space and a UE-specific search space) may have different periodicities for a UE to monitor.

The set of PDCCH candidates that are monitored by a UE may be defined in terms of PDCCH search space sets. A search space may define a set of aggregation levels (ALs), a number of PDCCH candidates for each AL, PDCCH monitoring occasions, and/or an RNTI or DCI format to be monitored. As one example, Type 0-PDCCH to Type 3-PDCCH may be used for a common search space, and a UE-specific search space set may be configured by SearchSpace in PDCCH-Config with searchSpaceType=UE-Specific for DCI formats with CRC scrambled by C-RNTI, or CS-RNTI(s).

LTE and NR Dynamic Spectrum Sharing

LTE and NR Dynamic Spectrum Sharing (DSS) allows both LTE and NR to be deployed in the same spectrum. In some embodiments, a single PCell may operate using both LTE and NR (e.g., with the same or different UEs), and DSS may be employed to share a portion of the spectrum between LTE- and NR-related transmissions. It is anticipated that DSS will leave the legacy LTE behavior unaffected, such that a UE communicating using LTE will not experience any behavior modifications in a DSS deployment. Rather, the more flexible resource utilization of 5G NR may be exploited such that a NR UE is able to selectively and dynamically utilize time and frequency resources that are currently under-utilized by the LTE communications.

In some embodiments, LTE has cell reference signals (CRS) scheduled in every slot of a frame. In various deployments, a UE may utilize either 1, 2 or 3 antenna ports for receiving CRS. According to the LTE standard, when a UE has 1 or 2 CRS ports, CRS occupies symbols {0, 4, 7, 11}, whereas when a has 4 CRS ports, CRS occupies symbols {0, 1, 4, 7, 8, 11}. In some embodiments, a PCell that implements DSS for LTE and NR may need to define a CORESET for scheduling NR communications, but the CORESET should be selected such that it does not overlap with the symbols scheduled for LTE CRS. For many types of UEs, the symbols reserved for LTE CRS may prevent the PCell from configuring a 3 symbol CORESET, or even a 2 symbol CORESET.

These and other considerations may significantly limit scheduling flexibility and control reliability for NR DSS communications. To address these and other concerns, embodiments herein presents systems, devices and methods for an SCell to implement cross-carrier scheduling to schedule NR communications for a PCell implementing LTE and NR DSS, to avoid collisions between LTE and NR control information.

Some embodiments may be structured to accommodate various existing communication protocols. For example, some embodiments may be structured to accommodate cross carrier scheduling (CCS) restrictions, where no cross cell group cross carrier scheduling is allowed, and that for each scheduled cell.

Additionally or alternatively, current DCI format restrictions may be taken into account when determining a DCI format for performing SCell cross-carrier scheduling for PCell NR communications. For example, fallback DCI, i.e. NR Format 0_0 and Format 1_0, may not support cross carrier scheduling. On the other hand, NR DCI Format 0_1, Format 0_2, Format 1_1 and Format 12 may support cross carrier scheduling. Additionally, Special DCI Format 2_0, 2_1, 2_2, 2_3, 2_4, 2_5, and 2_6 may support cross carrier scheduling.

Additionally or alternatively, search space configuration restrictions may be taken into account when performing SCell cross-carrier scheduling for NR DSS. For example, Type3-PDCCH common search space (CSS) may be configured for both fallback DCI formats and special DCI formats 2_x. Accordingly, the Type3-PDCCH CSS may be utilized to perform cross-carrier scheduling using Special DCI formats. Additionally or alternatively, the UE-specific Search Space may be utilized to perform cross-carrier scheduling. Conversely, Type0-PDCCH CSS (e.g., searchSpaceSIB1, searchSpaceZero), Type0A-PDCCH CSS (e.g., searchSpaceOtherSystemInformation), Type1-PDCCH CSS (e.g., pagingSearchSpace), and Type2-PDCCH CSS (e.g., ra-SearchSpace) may exclusively be used for fallback DCI, and may not be viable for performing cross carrier scheduling.

Embodiments herein propose enhancements for DSS deployments by implementing scheduling restrictions and selective common search space (CSS), UE-specific search space (USS), and DCI format handling for primary and secondary cells.

For a PCell performing LTE and NR DSS, the LTE communications of the PCell may utilize a 15 kHz subcarrier spacing (SCS). Accordingly, it may be desirable for the PCell to also perform NR communications with the same 15 kHz SCS. In some embodiments, when the PCell is scheduled by an SCell, it may be advantageous for the SCell to be configured with the same 15 kHz SCS or potentially with a 30 kHz SCS, so that it may more easily communicate with a UE that is also communicating with the PCell using the 15 kHz SCS. In some embodiments, the SCell that is performing NR CCS for the PCell may operate in the same frequency band as the PCell, e.g., frequency range 1 (FR1, below GHz).

Figure 5:
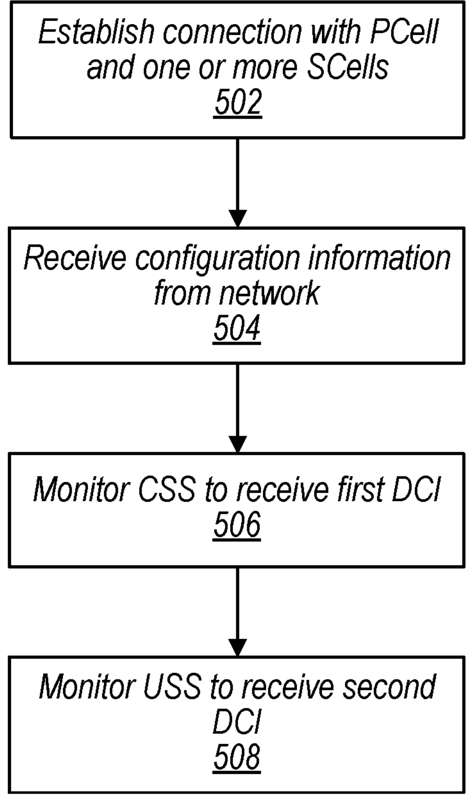
FIG. 5 is a flowchart diagram illustrating an exemplary method for a UE to perform cross-carrier scheduling in a dynamic spectrum sharing (DSS) scenario, according to some embodiments.

FIG. 5—Flowchart for UE to Perform Cross-Carrier Scheduling

FIG. 5 is a flowchart diagram illustrating an exemplary method for a UE to perform cross-carrier scheduling, according to some embodiments. FIG. 5 is similar in some respects to FIG. 6, described below, except that FIG. 5 describes a method from the perspective of the UE. It may be understood that the embodiments described in FIG. 5 may be combined with one or more elements or method steps described in FIG. 6, as desired. In various embodiments, some of the elements of the method shown may be performed concurrently, in a different order than shown, may be substituted for by other method elements, or may be omitted. Additional method elements may also be performed as desired.

Aspects of the method of FIG. 5 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor (s) 404, baseband processor(s), processor(s) associated with communication circuitry (e.g., 430, 432), etc., among various possibilities) may cause the BS to perform some or all of the illustrated method elements. The techniques of FIG. 5 may be applied to various cellular deployments, among various possibilities. As illustrated, the method described in FIG. 5 may operate as follows.

At 502, a UE establishes a connection with a primary cell (PCell) of a network and one or more secondary cells (SCells) of the network. The connection may utilize a 5G NR RAT. The connection may be established using radio resource control (RRC) messaging with the primary cell and/or the one or more secondary cells. The PCell and the one or more SCells may be instantiated within one or more gNB base stations.

At 504, configuration information is received from the network. The configuration information may be received from the PCell and/or from a first SCell of the one or more SCells.

The configuration information may include an indication to monitor a common search space (CSS) for first downlink control information (DCI) from the PCell and/or an indication to monitor a UE-specific search space (USS) for second DCI from the first SCell. The indication to monitor the CSS and the indication to monitor the USS may be included within one or more RRC configuration messages.

In some embodiments, the first DCI has either a 5th Generation New Radio (5G NR) fallback DC format of 0_0 or 1_0 or a 5G NR special DC format of 2_0, 2_1, 2_2, 2_3, 2_4, 2_5 or 2_6, whereas the second DCI has a 5G NR non-fallback DCI format of 0_1, 0_2, 1_1 or 1_2. Alternatively, in other embodiments the first DCI has the 5G NR fallback DCI format of 0_0 or 1_0 and the second DCI has either the 5G NR special DCI format of 2_0, 2_1, 2_2, 2_3, 2_4, 2_5 or 2_6 or the 5G NR non-fallback DC format of 0_1, 0_2, 1_1 or 1_2.

In some embodiments, the configuration information includes an indication of the formats of the first DCI and/or the second DCI. In other words, the 5G NR DCI format of one or both of the first and second DCIs may be specified by the configuration information.

In some embodiments, the second DCI is a multi-DCI for a multi-transmission and reception point (multi-TRP) operation. The first DCI from the primary cell may not include the multi-DCI for the multi-TRP operation. In other words, multi-TRP operation may be exclusively scheduled by the first SCell.

In some embodiments, the configuration information further includes an indication to monitor a Type3 physical downlink control channel (PDCCH) CSS for third DCI from the first SCell, and the third DCI has the 5G NR special DCI format. Alternatively, in other embodiments the configuration information further includes an indication to monitor a Type3 physical downlink control channel (PDCCH) CSS for third DCI from the primary cell, and the third DCI has the 5G NR fallback DCI format.

At 506, the UE may monitor the CSS to receive the first DCI from the primary cell. The UE may receive and decode the first DCI according to the DCI format indicated by the configuration information.

At 508, the UE may monitor the USS to receive the second DCI from the first SCell. The UE may receive and decode the second DCI according to the DCI format indicated by the configuration information.

The first DCI, the second DCI and/or the third DCI may include control information related to the connection with the PCell. For example, the first and/or second DCI may schedule a first communication between the UE and the PCell. The control information may include one or more of a scheduling indication for an uplink communication with the PCell and/or a scheduling indication for a downlink communication with the PCell. The PCell may transmit first DCI to schedule communications with the UE when it is able to do so. However, in some instances, the PCell may be utilizing available radio resources to transmit control information to another UE (e.g., over an LTE connection in a DSS deployment), and the SCell may take over to transmit the second DCI for scheduling communications between the UE and the PCell. In other words, the SCell may serve as a backup scheduling provider, to provide scheduling DCI when the PCell is currently unavailable for providing scheduling DCI.

Additionally or alternatively, the first and/or second DCI may indicate a behavior modification of the UE. For example, the control message may instruct the UE to go to sleep or to go dormant at a particular time, or to alter its connection status with the PCell and/or the SCell, among other possibilities.

In some embodiments, the UE may perform communications with the primary cell as scheduled by the first DCI and/or the second DCI. Performing communications with the primary cell may include transmitting an uplink communication to the primary cell or receiving a downlink communication from the primary cell according to the schedule of one or both of the first DCI and the second DCI. Communications between the UE and the PCell may be scheduled exclusively by DCI received from the PCell and the first SCell, and may not be scheduled by DCI received from any cell other than the PCell and the first SCell (e.g., additional secondary cells may not be used to transmit DCI to schedule communications between the UE and the primary cell). Additionally or alternatively, the PCell may not be used to transmit DCI to schedule communications with the UE for any cell other than the PCell. For example, if the PCell is scheduled by itself and the first SCell, it may not be used to schedule communications for the first SCell or for other SCells.

In some embodiments, the UE may not receive scheduling information for communications between the UE and the PCell from any cells other than the PCell and the first SCell. Communications between the UE and the first SCell may be scheduled by third DCI received from the first SCell. The UE may not schedule communications with the first SCell from DCI received from any cell other than the first SCell. The UE may additionally receive DCI from the first SCell scheduling communications between the UE and one or more other SCells.

Figure 6:
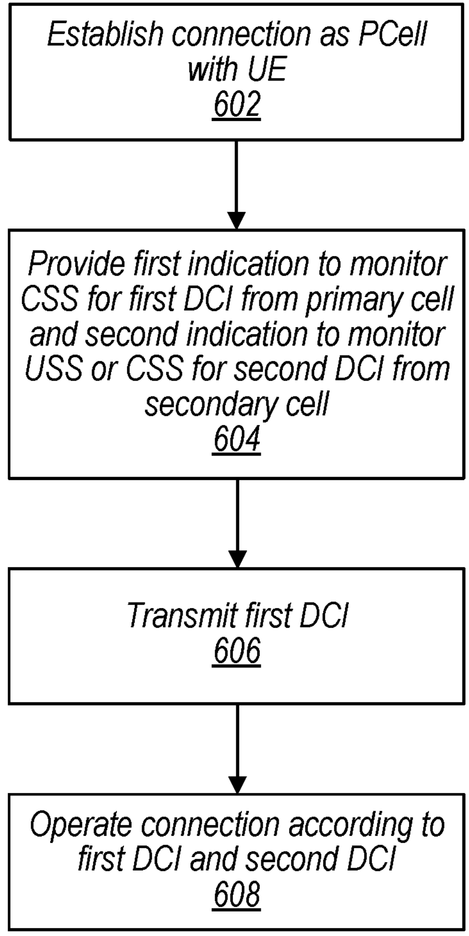
FIG. 6 is a flowchart diagram illustrating an exemplary method for a BS to perform cross-carrier scheduling in a dynamic spectrum sharing (DSS) scenario, according to some embodiments.

FIG. 6—Flowchart for UE to Perform Cross-Carrier Scheduling

FIG. 6 is a flowchart diagram illustrating an exemplary method for a base station to perform cross-carrier scheduling in a dynamic spectrum sharing (DSS) scenario, according to some embodiments. FIG. 6 is similar in some respects to FIG. 5, except that FIG. 6 describes a method from the perspective of the base station operating as the primary cell (PCell). It may be understood that the embodiments described in FIG. 6 may be combined with one or more elements or method steps described in FIG. 5, as desired. In various embodiments, some of the elements of the method shown may be performed concurrently, in a different order than shown, may be substituted for by other method elements, or may be omitted. Additional method elements may also be performed as desired.

Aspects of the method of FIG. 6 may be implemented by one or more base stations (e.g., BS 102) in communication with one or more wireless devices, such as the UE(s) 106, as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the BS (e.g., processor(s) 404, baseband processor(s), processor(s) associated with a radio, e.g., 430, etc., among various possibilities) may cause the BS to perform some or all of the illustrated method elements.

Similarly, one or more processors (or processing elements) of the UE (e.g., processor(s) 302, baseband processor (s), processor(s) associated with communication circuitry (e.g., 330), etc., among various possibilities) may cause the UE to perform some or all of the illustrated method elements. The techniques of FIG. 6 may be applied to various DSS deployments, among various possibilities. As illustrated, the method of FIG. 6 may operate as follows:

At 602, a connection is established by a base station as a PCell with a user equipment device (UE). The connection may utilize a 5G NR RAT. The connection may be established using radio resource control (RRC) messaging with the PCell. The UE may additionally establish a connection with one or more secondary cells (SCells). As described in greater detail below, a first SCell of the one or more SCells may be used to transmit downlink control information to schedule communications between the UE and the PCell and/or to perform other control functions in regard to the connection between the UE and the PCell. The PCell and one or more of the SCells may be instantiated within the base station, or they may instantiated in separate base stations. For example, the PCell and the first SCell may both instantiated by a single base station, or they may be operated as different base stations.

At 604, a first indication may be provided to the UE to monitor a common search space (CSS) for first downlink control information (DCI) from the PCell. Additionally or alternatively, a second indication may be provided to the UE to monitor a UE-specific search space (USS) for second DCI from a first SCell of the one or more SCells. Alternatively, as described in greater detail below, the second indication may direct the UE to monitor the CSS for second DCI with a special DCI format. The base station may transmit the first indication and/or the second indication as an RRC configuration message, or may alternatively use another type of signaling, such as MAC or PHY signaling. The first and second indications may be provided in a single transmission, or they may be provided in separate transmissions. The first DCI and the second DCI may each be related to the connection between the PCell and the UE. For example, they may each include control information related to scheduling of communications between the UE and the PCell. Additionally or alternatively, one or both of the first and second DCI may direct the UE to enter a particular state with regard to its connection with the PCell (e.g., transmit power control (TPC) commands for PUSCH/PUCCH/SRS and/or slot format changes, among other possibilities). The first indication and the second indication may be contained within a single or multiple RRC configuration messages, and each indication may be transmitted to the UE by either the PCell or the first SCell.

In some embodiments, the first DCI has either a 5th Generation New Radio (5G NR) fallback DCI format of 0_0 or 1_0 or a 5G NR special DCI format of 2_0, 2_1, 2_2, 2_3, 2_4, 2_5 or 2_6, whereas the second DCI has a 5G NR non-fallback DCI format of 0_1, 0_2, 1_1 or 1_2. Alternatively, in other embodiments the first DCI has the 5G NR fallback DCI format of 0_0 or 1_0 and the second DCI has either the 5G NR special DCI format of 2_0, 2_1, 2_2, 2_3, 2_4, 2_5 or 2_6 or the 5G NR non-fallback DCI format of 0_1, 0_2, 1_1 or 1_2.

In some embodiments, the first and second indications include an indication of the formats of the first DCI and/or the second DCI. In other words, the 5G NR DCI format of one or both of the first and second DCIs may be specified by the first and second indications, respectively.

At 606, the base station, acting as a PCell for the UE, transmits the first DCI. The first DCI may be transmitted in a DCI format indicated by the first indication. The first SCell may also transmit the second DCI to the UE.

At 608, the connection is operated according to the first DCI and the second DCI. for example, uplink and/or downlink communications may be performed between the UE and the PCell according to scheduling information of the first and/or second DCI. Alternatively or additionally, one or both of the first DCI and the second DCI may include control information to alter the behavior of the UE with respect to its connection with the PCell. For example, the first DCI or the second DCI may instruct the UE to alter the state of the RRC connection with the PCell, and the UE may alter its state accordingly.

In some embodiments, the connection with the UE utilizes a 5th Generation New Radio (5G NR) radio access technology (RAT). The base station may additionally establish a second connection with a second UE using a Long Term Evolution (LTE) RAT. The second UE may be the same or different from the UE that establishes the connection at step 602. In these embodiments, the base station may transmit third DCI to the second UE to schedule LTE communications and/or implement control procedures with the second UE. The first DCI may be scheduled to not overlap in radio resources with the third DCI transmitted for the second connection with the second UE.

In some embodiments, the base station communicates with the UE (over 5G NR) and the second UE (over LTE) using a 15 kHz subcarrier spacing, and the secondary cell communicates with the UE using either the 15 kHz or a 30 kHz subcarrier spacing.

In some embodiments, a third indication is provided to the UE to monitor the USS for third DCI from the first SCell, where the third DCI schedules a communication with a second SCell of the one or more SCells.

In some embodiments, operating the connection according to the first DCI and the second DCI comprises one or more of receiving one or more uplink communications from the UE according to scheduling information of the first DCI or the second DCI, or transmitting one or more downlink communications to the UE according to the scheduling information of the first DCI or the second DCI.

Figure 7:
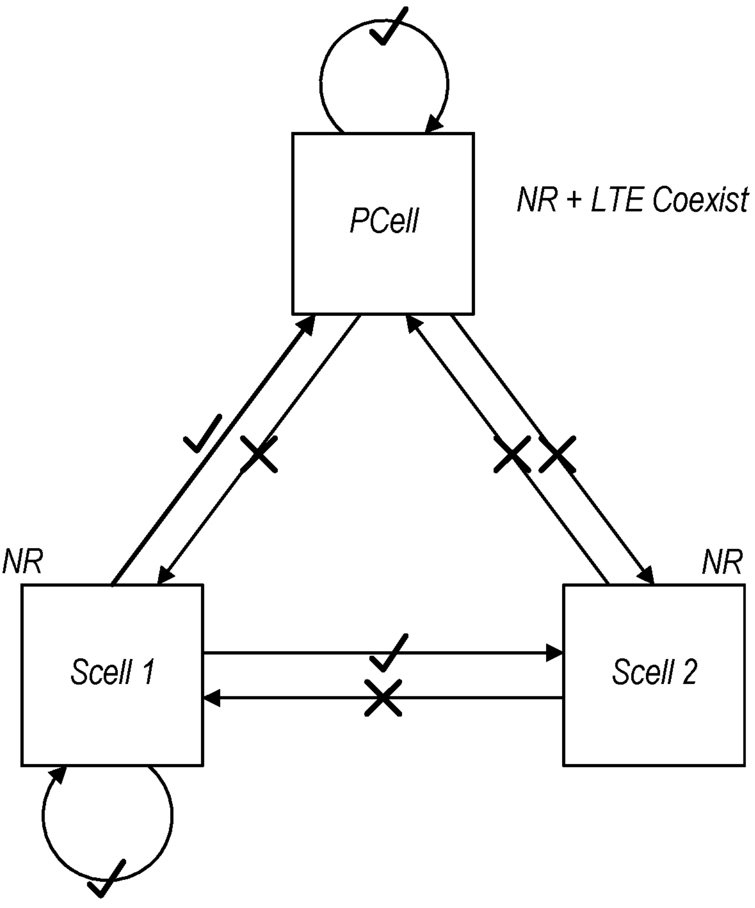
FIG. 7 is a schematic diagram illustrating scheduling relationships between a primary cell and two secondary cells, according to some embodiments.

FIG. 7—Cross-Carrier Scheduling

FIG. 7 is a schematic diagram illustrating cross-carrier scheduling between a PCell and two SCells (SCell 1 and SCell 2), according to some embodiments. In FIG. 7, a check-marked arrow indicates that a cell is capable of scheduling the other cell, whereas an x-ed arrow indicates that the cell is not allowed to schedule the other cell. As illustrated, the PCell may be self-scheduled and/or may be scheduled by another SCell (SCell 1). The PCell may only be scheduled by at most one SCell. The SCell that schedules the PCell may not be scheduled by the other SCell (SCell 2). The SCell that schedules the PCell may schedule the other SCell (SCell2) and/or itself (SCell 1). The PCell may not schedule cells other than itself (i.e., it may not schedule either SCell 1 or SCell 2). While FIG. 7 shows a deployment with a single PCell and two SCells, it may be appreciated how the described scheduling rules may be generalized to deployments with more than two SCells.

In some embodiments, multi-DCI based multi-transmission and reception point (multi-TRP) operation may be configured. In these embodiments, the scheduling SCell for the multi-DCI based multi-TRP operation may be utilized to schedule each of the multiple TRPs. In other words, if the network configures the PCell to be scheduled by an SCell, the CORESET configured on the SCell that schedules the PCell may be configured with two different CORESETPoolIndex values.

In some embodiments, when the PCell is configured to be scheduled by an SCell, the UE may not be expected to be configured with physical downlink shared channel (PDSCH) processing capability #2 or physical uplink shared channel (PUSCH) processing capability #2.

In some embodiments, when the PCell is configured to be scheduled by an SCell, depending on the capabilities of the served UE, the UE may be capable or not capable of utilizing a PDCCH monitoring occasion outside the first 3 symbols in each slot. If the UE is only capable of utilizing a PDCCH monitoring occasion during the first 3 symbols in each slot, a UE that is scheduled with the CRS symbols described above may only have 2 (for a 1 or 2 antenna port CRS) or 1 (for a 4 antenna port CRS) available symbols for receiving NR CORESET control information. Accordingly, for this type of UE, it may be desirable to utilize an SCell for cross-carrier scheduling to improve reception of NR control information. Alternatively, for a UE that is capable of utilizing a PDCCH monitoring occasion outside the first 3 symbols in each slot (e.g., for a UE that supports Feature Group 3-2 (FG3-2), i.e. supports pdcchMonitoringSingleOccasion), the UE may still be able to receive 2 symbols of an NR CORESET (e.g., for a 4 antenna port CRS) or 3 symbols of an NR CORESET (e.g., for a 1 or 2 antenna port CRS) by scheduling the NR CORESET between scheduled CRS symbols (e.g., the NR CORESET may be scheduled for symbols 8, 9 and 10 for a 1 or 2 antenna port CRS). Accordingly, for a UE with this type of capability, in some embodiments it may not be necessary or desirable to configure an SCell to perform cross-carrier scheduling for the PCell. Alternatively, even if a UE supports advanced PDCCH monitoring capabilities (for example FG3-2, FG3-5b, etc.), when the UE configures the SCell to schedule the PCell, the network may not configure advanced PDCCH monitoring capability on the SCell, and all PDCCH monitoring occasions may be configured within the first 3 symbols in each slot. In these embodiments it may be desirable for the SCell to perform cross-carrier scheduling for the PCell, even for a UE with advanced PDCCH monitoring capabilities.

In some embodiments, a Carrier Indicator Field (CIF) may be set to zero for self-scheduling and the CIF may be set to an integer value from 1 to 7 for cross carrier scheduling.

Figure 8:
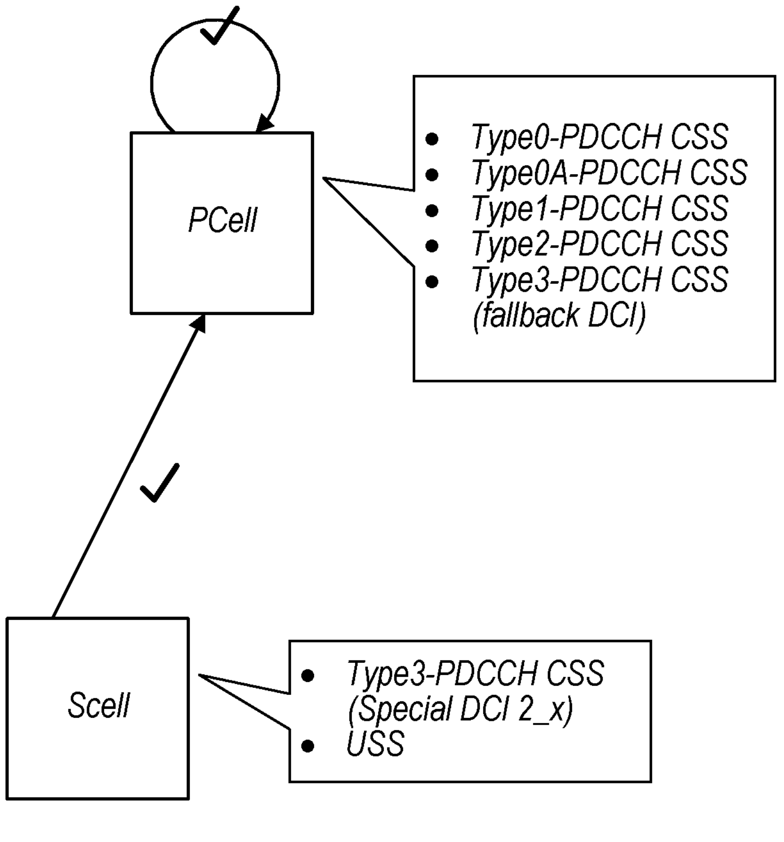
FIG. 8 is a schematic diagram illustrating search space utilization by a primary cell and a secondary cell, according to some embodiments.
Figure 9:
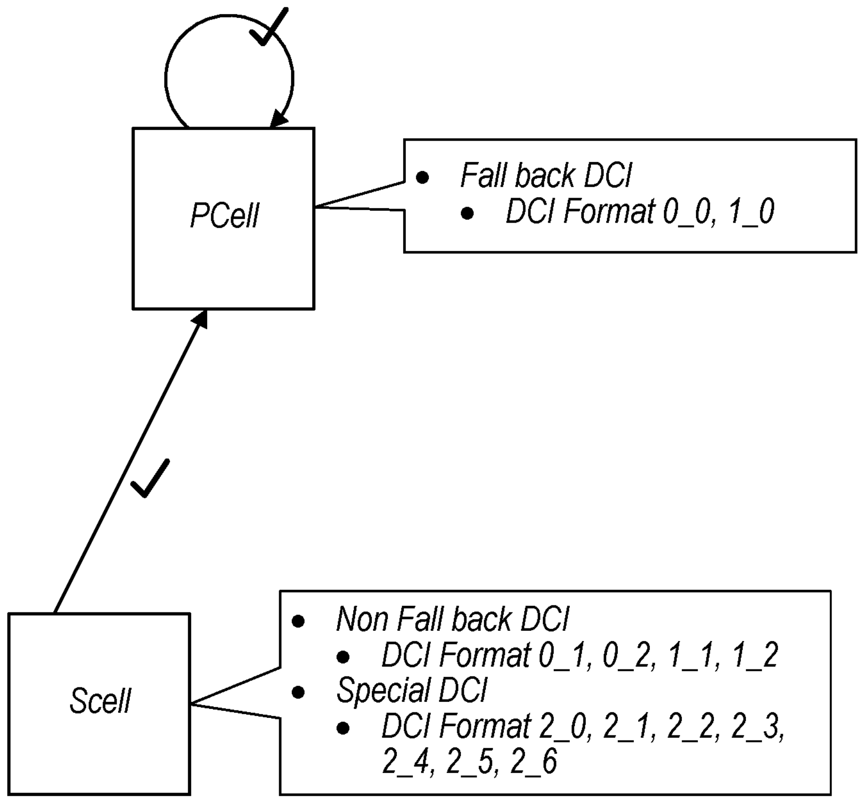
FIG. 9 is a schematic diagram illustrating downlink control information formats for a primary cell and a secondary cell, according to some embodiments.

FIGS. 8-9—USS/CSS and DCI Format Handling

FIGS. 8 and 9 are schematic diagrams illustrating search space utilization and DCI formats for the PCell and the first SCell, according to various embodiments. In some embodiments, the PCell is scheduled by both itself and another SCell, and separate search spaces may be utilized by the PCell and the SCell for scheduling. For example, the PCell may utilize Type0-PDCCH CSS, Type0A-PDCCH CSS, Type1-PDCCH CSS, Type2-PDCCH CSS, and Type3-PDCCH CSS (only for fallback DCI formats). Conversely, the Scell may utilize the UE-specific Search Space (USS) and Type3-PDCCH CSS (only for Special DCI formats). Additionally, different NR DCI formats may be selectively utilized by either the PCell or the SCell for scheduling. For example, the PCell may utilize NR fallback DCI formats 0_0 and 1_0, which do not support cross carrier scheduling, while the SCell may utilize NR non-fallback DCI formats 0_1, 0_2, 1_1, 1_2, and NR special DCI formats 2_0, 2_1, 2_2, 2_3, 2_4, 2_5, and 2_6, which do support cross-carrier scheduling.

The UE may not be expected to be configured with a CSS (Common Search Space) in both the PCell and an SCell that schedules the PCell. More specifically, the UE may not be expected to be configured and/or scheduled with a CSS in any SCell that schedules a PCell. The UE may not be expected to be configured with a USS (User-specific Search Space) in both a PCell and an SCell that schedules the PCell. The UE may not expected to be configured with fallback DCI (0_0, 1_0) in both a PCell and an SCell that schedules the PCell. More specifically, UE may not be expected to be configured with a fallback DCI in any SCell that schedules a PCell. The UE may not be expected to be configured with special DCI (2_0, 2_1, 2_2, 2_3, 2_4, 2_5, 2_6) in both a PCell and an SCell that schedules the PCell. More specifically, the UE may not be expected to be configured with special DCI in any SCell that schedules a PCell. The UE may not be expected to be configured with non-fallback DCI (0_1, 1_1) in both a PCell and an SCell that schedules the PCell.

Type3-PDCCH CSS may be allowed to be configured in an SCell that schedules a PCell. In this case, only Special DCI (2_0, 2_1, 2_2, 2_3, 2_4, 2_5, 2_6) may be configured in the Type3-PDCCH CSS that is configured in the SCell. Special DCI (2_0, 2_1, 2_2, 2_3, 2_4, 2_5, 2_6) may be configured in the SCell. However, for DCI Format 2_6, when it is configured in the SCell, it may not be used to configure the SCell to operate in dormancy mode.

Additional Embodiments

The following numbered paragraphs describe additional embodiments.

In some embodiments, an apparatus comprises a processor configured to cause a user equipment device (UE) to perform the following method steps. The processor is configured to cause the UE to establish a connection with a primary cell of a network and receive configuration information from the network. The configuration information comprises an indication to monitor a common search space (CSS) for first downlink control information (DCI) from the primary cell and an indication to monitor a UE-specific search space (USS) for second DCI from a secondary cell.

In some embodiments, the processor is further configured to cause the UE to monitor the CSS and the USS, and receive the first DCI from the primary cell and the second DCI from the secondary cell, wherein the first DCI and the second DCI comprise control information related to the connection with the primary cell.

In some embodiments, the indication to monitor the CSS and the indication to monitor the USS comprise one or more radio resource control (RRC) configuration messages.

In some embodiments, the second DCI comprises a multi-DCI for a multi-transmission and reception point (multi-TRP) operation, and the first DCI does not comprise the multi-DCI for the multi-TRP operation.

In some embodiments, the first DCI has a 5th Generation New Radio (5G NR) fallback DCI format of 0_0 or 1_0; or a 5G NR special DCI format of 2_0, 2_1, 2_2, 2_3, 2_4, 2_5 or 2_6; and the second DCI has a 5G NR non-fallback DCI format of 0_1, 0_2, 1_1 or 1_2.

In some embodiments, the configuration information further comprises an indication that the first DCI has a 5th Generation New Radio (5G NR) fallback DCI format of 0_0 or 1_0, and the configuration information further comprises an indication that the second DCI has a 5G NR non-fallback DCI format of 0_1, 0_2, 1_1 or 1_2; or a 5G NR special DCI format of 2_0, 2_1, 2_2, 2_3, 2_4, 2_5 or 2_6.

In some embodiments, the configuration information further comprises an indication to monitor a Type3 physical downlink control channel (PDCCH) CSS for third DCI from the secondary cell, wherein the third DCI has a 5th Generation New Radio (5G NR) special DCI format.

In some embodiments, the configuration information further comprises an indication to monitor a Type3 physical downlink control channel (PDCCH) CSS for third DCI from the primary cell, wherein the third DCI has a 5th Generation New Radio (5G NR) fallback DCI format.

In some embodiments, the control information related to the connection with the primary cell comprises one or more of a scheduling indication for an uplink communication with the primary cell; a scheduling indication for a downlink communication with the primary cell; and a control message indicating a behavior modification of the UE.

In some embodiments, an apparatus comprises a processor configured to cause a user equipment device (UE) to perform the following method steps. The processor is configured to cause the UE to establish a connection with a primary cell of a network and receive configuration information from the network. The configuration information comprises an indication to monitor for first downlink control information (DCI) from the primary cell; an indication that the first DCI has a 5th Generation New Radio (5G NR) fallback DCI format; an indication to monitor for second DCI from a secondary cell; and an indication that the second DCI has a 5G NR non-fallback DCI format or a 5G NR special DCI format.

In some embodiments, the processor is further configured to cause the UE to receive the first DCI from the primary cell and the second DCI from the secondary cell, wherein the first DCI and the second DCI comprise control information related to the connection with the primary cell.

In some embodiments, wherein the 5G NR fallback DCI format is 0_0 or 1_0; wherein the 5G NR non-fallback DCI format is 0_1, 0_2, 1_1 or 1_2; and wherein the 5G NR special DC format is 2_0, 2_1, 2_2, 2_3, 2_4, 2_5 or 2_6.

In some embodiments, an apparatus comprises a processor configured to cause a user equipment device (UE) to perform the following method steps. The processor is configured to cause the UE to establish a connection with a primary cell of a network and receive configuration information from the network. The configuration information comprises an indication to monitor a common search space (CSS) for first downlink control information (DCI) from the primary cell and second DCI from a secondary cell; an indication that the first DCI has a 5th Generation New Radio (5G NR) fallback DCI format; and an indication that the second DCI has a special 5th Generation New Radio (5G NR) DCI format.

In some embodiments, the processor is further configured to cause the UE to monitor the CSS; and receive the first DCI from the primary cell and the second DCI from the secondary cell, wherein the first DCI and the second DCI comprise control information related to the connection with the primary cell.

In some embodiments, the 5G NR fallback DCI format is 0_0 or 1_0; and the 5G NR special DC format is 2_0, 2_1, 2_2, 2_3, 2_4, 2_5 or 2_6.

In some embodiments, an apparatus comprises a processor configured to cause a base station to perform the following method steps. The processor is configured to cause the base station to establish a connection as a primary cell with a user equipment device (UE); and provide configuration information to the UE. The configuration information comprises an indication for the UE to monitor for first downlink control information (DCI) from the primary cell, wherein the first DCI is related to the connection between the primary cell and the UE; an indication that the first DCI has a 5th Generation New Radio (5G NR) fallback DCI format; an indication for the UE to monitor for second DCI from a secondary cell, wherein the second DCI is related to the connection between the primary cell and the UE; and an indication that the second DCI has a 5G NR non-fallback DCI format or a 5G NR special DCI format. and In some embodiments, the processor is further configured to cause the base station to operate the connection according to the first DCI and the second DCI.

In some embodiments, the 5G NR fallback DCI format is 0_0 or 1_0; wherein the 5G NR non-fallback DCI format is 0_1, 0_2, 1_1 or 1_2; wherein the 5G NR special DCI format is 2_0, 2_1, 2_2, 2_3, 2_4, 2_5 or 2_6.

In some embodiments, an apparatus comprises a processor configured to cause a base station to perform the following method steps. The processor is configured to cause the base station to establish a connection as a primary cell with a user equipment device (UE) and provide configuration information to the UE. The configuration information comprises an indication for the UE to monitor a common search space (CSS) for first downlink control information (DCI) from the primary cell and second DCI from a secondary cell, wherein the first DCI and the second DCI are related to the connection between the primary cell and the UE; an indication that the first DCI has a 5th Generation New Radio (5G NR) fallback DCI format; and an indication that the second DCI has a 5G NR special DCI format; and In some embodiments, the processor is further configured to cause the base station to operate the connection according to the first DCI and the second DCI.

In some embodiments, the 5G NR fallback DCI format is 0_0 or 1_0; and the 5G NR special DCI format is 2_0, 2_1, 2_2, 2_3, 2_4, 2_5 or 2_6.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:

by a user equipment (UE) device:

receive configuration information from the network, wherein the configuration information indicates whether communications on a primary cell in frequency range 1 (FR1) are configured to be scheduled by a first secondary cell in addition to the primary cell, wherein when communications on the primary cell are configured to be scheduled by the first secondary cell:

the configuration information does not configure an advanced PDCCH monitoring capability on the first secondary cell while the UE supports the advanced PDCCH monitoring capability, and the first secondary cell is in FR1;

receiving first downlink control information (DCI) from the primary cell; and receiving second DCI from the first secondary cell, wherein the first DCI and the second DCI comprise control information for respective communications on the primary cell.

2. The method of claim 1, further comprising receiving a first indication to monitor a common search space (CSS) for the first DCI from the primary cell; and receiving a second indication to monitor a UE-specific search space (USS) for the second DCI from the first secondary cell.

3. The method of claim 2, further comprising:

receiving a third indication to monitor the USS for third DCI from the first secondary cell, wherein the third DCI schedules a communication with a second secondary cell.

4. The method of claim 2, wherein the first indication and the second indication comprise one or more radio resource control (RRC) configuration messages.

5. The method of claim 1, further comprising:

establishing a connection with a second secondary cell of the network, wherein the second secondary cell is not configured to schedule communications for the primary cell.

6. The method of claim 1, wherein the control information for respective communications on the primary cell comprises scheduling information for communications between the primary cell and the UE device.

7. The method of claim 1, wherein the second DCI has a 5G NR non-fallback DCI format of 0_1, 0_2, 1_1 or 1_2.

8. The method of claim 1, further comprising:

operating the connection according to the first DCI and the second DCI by performing one or more of:

transmitting one or more uplink communications to a base station according to scheduling information of the first DCI or the second DCI;

receiving one or more downlink communications from the base station according to the scheduling information of the first DCI or the second DCI.

9. The method of claim 1, wherein the first DCI has:

a 5th Generation New Radio (5G NR) fallback DCI format of 0_0 or 1_0; or a 5G NR special DCI format of 2_0, 2_1, 2_2, 2_3, 2_4, 2_5 or 2_6, and wherein the second DCI has a 5G NR non-fallback DCI format of 0_1, 0_2, 1_1 or 1_2.

10. The method of claim 1, wherein the first DCI has:

a 5th Generation New Radio (5G NR) fallback DCI format of 0_0 or 1_0; and wherein the second DCI has:

a 5G NR non-fallback DCI format of 0_1, 0_2, 1_1 or 1_2; or a 5G NR special DCI format of 2_0, 2_1, 2_2, 2_3, 2_4, 2_5 or 2_6.

11. The method of claim 1, wherein the first DCI and the second DCI each comprise one or more of:

a scheduling indication for an uplink communication with the primary cell;

a scheduling indication for a downlink communication with the primary cell; and a control message indicating a behavior modification of the UE device.

12. A user equipment (UE) device, comprising:

a radio;

a processor communicatively coupled to the radio, wherein the UE device is configured to:

receive configuration information from the network, wherein the configuration information indicates whether communications on a primary cell in frequency range 1 (FR1) are configured to be scheduled by a first secondary cell in addition to the primary cell, wherein when communications on the primary cell are configured to be scheduled by the first secondary cell:

the configuration information does not configure an advanced PDCCH monitoring capability on the first secondary cell while the UE supports the advanced PDCCH monitoring capability, and the first secondary cell is in FR1;

receive first downlink control information (DCI) from the primary cell; and receive second DCI from the first secondary cell, wherein the first DCI and the second DCI comprise control information for respective communications on related to the connection between the primary cell and the UE device.

13. The UE device of claim 12, wherein the UE device is further configured to:

receive a first indication to monitor a common search space (CSS) for the first DCI from the primary cell; and receive a second indication to monitor a UE-specific search space (USS) for the second DCI from the first secondary cell.

14. The UE device of claim 13, wherein the UE device is further configured to:

receive a third indication to monitor the USS for third DCI from the first secondary cell, wherein the third DCI schedules a communication with a second secondary cell.

15. The UE device of claim 13, wherein the first indication and the second indication comprise one or more radio resource control (RRC) configuration messages.

16. The UE device of claim 12, wherein the UE device is further configured to:

establish a connection with a second secondary cell of the network, wherein the second secondary cell is not configured to schedule communications for the primary cell.

17. An apparatus, comprising:

a processor configured to cause a user equipment (UE) device to:

receive configuration information from the network, wherein the configuration information indicates whether communications on the primary cell in frequency range 1 (FR1) are configured to be scheduled by a first secondary cell in addition to a primary cell, wherein when communications on the primary cell are configured to be scheduled by the first secondary cell:

the configuration information does not configure an advanced PDCCH monitoring capability on the first secondary cell while the UE supports the advanced PDCCH monitoring capability, and the first secondary cell is in FR1;

receive first downlink control information (DCI) from the primary cell; and receive second DCI from the first secondary cell, wherein the first DCI and the second DCI comprise control information for respective communications on the primary cell.

18. The apparatus of claim 17, wherein the processor is further configured to cause the UE device to:

receive a first indication to monitor a common search space (CSS) for the first DCI from the primary cell; and receive a second indication to monitor a UE-specific search space (USS) for the second DCI from the first secondary cell.

19. The apparatus of claim 17, wherein the first DCI has:

a 5th Generation New Radio (5G NR) fallback DCI format of 0_0 or 1_0; or a 5G NR special DCI format of 2_0, 2_1, 2_2, 2_3, 2_4, 2_5 or 2_6, and wherein the second DCI has a 5G NR non-fallback DCI format of 0_1, 0_2, 1_1 or 1_2.

20. The apparatus of claim 17, wherein the first DCI has:

a 5th Generation New Radio (5G NR) fallback DCI format of 0_0 or 1_0; and wherein the second DCI has:

a 5G NR non-fallback DCI format of 0_1, 0_2, 1_1 or 1_2; or a 5G NR special DCI format of 2_0, 2_1, 2_2, 2_3, 2_4, 2_5 or 2_6.

* * * * *